United States Patent

Ishizuka et al.

[11] Patent Number: 6,019,802
[45] Date of Patent: Feb. 1, 2000

[54] NONAQUEOUS SECONDARY BATTERY AND PROCESS FOR PRODUCING THE SAME USING A DISPERSION AID

[75] Inventors: Hiroshi Ishizuka; Hideki Tomiyama, both of Kanagawa, Japan

[73] Assignee: Fuji Photo Film Co., Ltd., Kanagawa, Japan

[21] Appl. No.: 08/839,239

[22] PCT Filed: Oct. 26, 1995

[86] PCT No.: PCT/JP95/02205

§ 371 Date: Apr. 17, 1997

§ 102(e) Date: Apr. 17, 1997

[30] Foreign Application Priority Data

Oct. 27, 1994 [JP] Japan .................................. 6-263794
Nov. 4, 1994 [JP] Japan .................................. 6-293635
Mar. 31, 1995 [JP] Japan .................................. 7-075232

[51] Int. Cl.[7] .................................................. H01M 6/14
[52] U.S. Cl. ........................................ 29/623.5; 429/232
[58] Field of Search .................................. 429/215, 218, 429/218.1, 231.1, 231.8, 232; 29/623.5

[56] References Cited

U.S. PATENT DOCUMENTS

| | | |
|---|---|---|
| 4,216,247 | 8/1980 | Ikeda et al. . |
| 4,297,231 | 10/1981 | Kahara et al. . |
| 4,601,919 | 7/1986 | Asami et al. ................. 427/126.3 |
| 5,041,199 | 8/1991 | Di Franco ..................... 204/181.5 |
| 5,432,029 | 7/1995 | Mitate et al. ................... 429/194 |
| 5,514,488 | 5/1996 | Hake et al. ..................... 429/122 |
| 5,683,834 | 11/1997 | Fujimoto et al. ............... 429/218 |
| 5,759,714 | 6/1998 | Matsufuji et al. .............. 429/194 |

FOREIGN PATENT DOCUMENTS

| | | |
|---|---|---|
| 0450848 A2 | 10/1991 | European Pat. Off. . |
| 0657953 A1 | 6/1995 | European Pat. Off. . |
| 4188560 | 7/1992 | Japan . |
| 5029022 | 2/1993 | Japan . |

*Primary Examiner*—Maria Nuzzolillo
*Assistant Examiner*—Jennifer O'Malley
*Attorney, Agent, or Firm*—Sughrue, Mion, Zinn Macpeak & Seas, PLLC

[57] ABSTRACT

The invention relates to a process for producing nonaqueous secondary battery comprising, in a battery case, positive and negative electrodes capable of intercalating and deintercalating lithium and a nonaqueous electrolyte containing a lithium salt, the electrodes being prepared by applying a water-dispersion electrode material mixture paste containing at least an active material capable of intercalating and deintercalating lithium and at least one conducting agent comprising a carbonaceous compound onto a collector and drying, wherein at least one of the electrodes is prepared from a water-dispersion electrode material mixture paste which is prepared by using a dispersion comprising water having dispersed therein at least one conducting agent together with a dispersion aid. The invention also relates to a nonaqueous secondary battery wherein at least one of the positive and negative electrode sheets is prepared from a water-dispersion electrode material mixture paste which is prepared by using a dispersion comprising water having dispersed therein at least one conducting agent together with a dispersion aid. The water-dispersion paste used in the negative electrode sheet has a pH of 5 to 10. The thickness of the electrode material mixture on one side of the negative electrode is 5 to 80 μm and that of the positive electrode is 90 to 180 μm at the time of battery assembly.

7 Claims, 1 Drawing Sheet

NONAQUEOUS SECONDARY BATTERY AND PROCESS FOR PRODUCING THE SAME USING A DISPERSION AID

FIELD OF THE INVENTION

This invention relates to a nonaqueous secondary battery having improved charge and discharge characteristics such as discharge potential, discharge capacity, and charge and discharge cycle life. More particularly, the invention relates to a nonaqueous secondary battery in which a water-dispersion paste of an electrode material mixture is used for the preparation of an electrode, and a process for producing such a battery.

BACKGROUND OF THE INVENTION

Lithium ion batteries capable of intercalating and deintercalating a lithium ion have recently been put to practical use as a nonaqueous secondary battery having high discharge potential and discharge capacity. A positive electrode active material or negative electrode material capable of intercalating and deintercalating lithium is dispersed in a disperse medium together with a (electric) conducting agent and a binder by means of a dispersing machine, such as a homogenizer or a planetary mixer, to form a dispersion paste. The dispersion paste is applied onto a current collector and dried to prepare a sheet electrode. A nonaqueous solvent is frequently selected as a disperse medium so as to avoid direct deterioration of the active material by water and deterioration of battery performance by a residual water content in battery assembly. However, use of an organic solvent incurs such problems as deterioration of the working environment, environmental pollution arising from the waste, and difficulty in forming a uniform film. Hence, it has been demanded to handle electrode active materials in a water-dispersion system.

It has been pointed out that a positive electrode active material or a negative electrode material, which is a compound capable of intercalating or deintercalating lithium, especially a negative electrode material is not stable in water and gives adverse influences to the discharge capacity and charge and discharge cycle characteristics of a nonaqueous secondary battery. JP-A-1-296567 (the term "JP-A" as used herein means an "unexamined published Japanese patent application"), JP-A-3-145071, and JP-A-3-64860 disclose methods comprising previously washing an active material with water. These methods are still unsatisfactory in improving discharge characteristics. While the reasons why charge and discharge cycle characteristics are deteriorated where an electrode material mixture paste of a water-dispersion system is used have not yet been elucidated, it has been suggested that there is some factor which increases the internal resistance of a battery in charge and discharge cycles in addition to the above-mentioned reasons.

An object of the present invention is to provide a nonaqueous secondary battery having improved charge and discharge characteristics such as discharge potential, discharge capacity, and charge and discharge cycle life, and a process for producing the same. Another object of the invention is to provide a nonaqueous secondary battery having an electrode prepared by using a water-dispersion electrode material mixture paste having improved dispersibility and a process for producing the same. A further object of the invention is to provide a process for preparing a water-dispersion paste of an electrode material mixture with improved dispersibility and a nonaqueous secondary battery which is produced by taking advantage of that process. A still further object of the invention is to provide a nonaqueous secondary battery having the optimum thickness which is prepared by using an electrode material mixture having improved dispersibility and a process for producing the same.

DISCLOSURE OF THE INVENTION

The above objects of the invention are accomplished by a process for producing a nonaqueous secondary battery comprising, in a battery case, positive and negative electrodes capable of intercalating and deintercalating lithium and a nonaqueous electrolyte containing a lithium salt, the electrodes being prepared by applying a water-dispersion electrode material mixture paste containing at least an active material capable of intercalating and deintercalating lithium and at least one (electric) conducting agent comprising a carbonaceous compound onto a current collector and drying, wherein the process is characterized in that at least one of the electrodes is prepared from a water-dispersion electrode material mixture paste which is prepared by using a dispersion comprising at least one (electric) conducting agent and a dispersion aid dispersed in water.

The embodiments for carrying out the invention are described below.

(1) A process for producing an aqueous secondary battery comprising, in a battery case, positive and negative electrodes capable of intercalating and deintercalating lithium and a nonaqueous electrolyte containing a lithium salt, the electrodes being prepared by applying a water-dispersion electrode material mixture paste containing at least an active material capable of intercalating and deintercalating lithium and at least one (electric) conducting agent comprising a carbonaceous compound onto a current collector and drying, wherein the process is characterized in that at least one of the electrodes is prepared from a water-dispersion electrode material mixture paste which is prepared by using a dispersion comprising water having dispersed therein at least one (electric) conducting agent together with a dispersion aid.

(2) A process for producing a negative electrode sheet for a nonaqueous secondary battery, which comprises applying a water-dispersion electrode material mixture paste containing at least an active material capable of intercalating and deintercalating lithium onto a current collector and drying, wherein the process is characterized in that the pH of the water-dispersion electrode material mixture paste is from 5 to 10.

(3) A nonaqueous secondary battery comprising, in a battery case, positive and negative electrode sheets and a nonaqueous electrolyte containing a lithium salt, the electrodes being prepared by applying a water-dispersion electrode material mixture paste containing at least an active material capable of intercalating and deintercalating lithium and at least one (electric) conducting agent comprising a carbonaceous compound onto a current collector and drying, wherein the processing is characterized in that at least one of the positive and negative electrode sheets is prepared from a water-dispersion electrode material mixture paste which is prepared by using a dispersion comprising water having dispersed therein at least one conducting agent together with a dispersion aid.

(4) A nonaqueous secondary battery comprising, in a battery case, positive and negative electrode sheets and a nonaqueous electrolyte containing a lithium salt, the electrodes being prepared by applying a water-dispersion electrode material mixture paste containing at least an active material capable of intercalating and deintercalating lithium and at least one (electric) conducting agent comprising a carbonaceous compound onto a current collector and drying, the water-dispersion paste to be used for the preparation of the negative electrode sheet is characterized by having a pH of from 5 to 10.

(5) A nonaqueous secondary battery described in (3) above, wherein the water-dispersion paste to be used for the preparation of the negative electrode sheet is characterized by having a pH of from 5 to 10.

(6) A nonaqueous secondary battery having a negative electrode sheet and a positive electrode sheet each comprising a (electric) conductive support sheet having provided on both sides thereof an electrode material mixture by coating or press bonding, wherein the battery is characterized in that the thickness of the electrode material mixture on one side of the negative electrode is 10 to 80 μm and that of the positive electrode is 100 to 180 μm both at the time of battery assembly.

(7) A nonaqueous secondary battery described in any one of (3) to (5) above, which has a negative electrode sheet and a positive electrode sheet each comprising a (electric) conducting support sheet having provided on both sides thereof an electrode material mixture by coating or press bonding, wherein the battery is characterized in that the thickness of the electrode material mixture on one side of the negative electrode is 5 to 80 μm and that of the positive electrode is 90 to 180 μm both at the time of battery assembly.

(8) A nonaqueous secondary battery described in (3) above, which is characterized in that at least one (electric) conducting agent dispersed in water is acetylene black.

(9) A nonaqueous secondary battery described in any one of (3) to (6) above, which is characterized in that at least one positive electrode active material contained in the positive electrode material mixture is $Li_aMO_b$, wherein M represents one or more transition metal(s) in which at least one of the transition metal(s) is selected from the group consisting of Co, Mn, Ni, V and Fe; a represents 0.2 to 1.2; and b represents 1.4 to 3.

(10) A nonaqueous secondary battery described in any one of (3) to (6) above, which is characterized in that at least one negative electrode active material contained in the negative electrode material mixture is a compound selected from the group consisting of an oxide and a chalcogen compound containing at least one element selected from the elements belonging to the groups IIIA, IVA, and VA of the Periodic Table.

(11) A nonaqueous secondary battery described in (4) above, which is characterized in that the water-dispersion paste used in the negative electrode sheet has a pH of 6 to 9.

(12) A nonaqueous secondary battery described in (4) or (11) above, which is characterized in that the water-dispersion paste used in the negative electrode sheet is maintained at a temperature of not lower than 5° C. to lower than 80° C.

(13) A nonaqueous secondary battery described in any one of (4), (11), and (12) above, which is characterized in that the water-dispersion paste is applied to the current collector within 7 days from the preparation.

(14) A nonaqueous secondary battery described in (6) above, which is characterized in that the thickness of the electrode material mixture on one side of the negative electrode is 10 to 80 μm and that of the positive electrode is 100 to 170 μm.

(15) A nonaqueous secondary battery described in (10) above, which is characterized in that the negative electrode active material of (10) above is represented by formula (1):

$$SnM^1_xO_y \quad (1)$$

wherein $M^1$ represents one or more metal(s) in which at least one of the metal(s) is selected from the group consisting of Si, Ge, Pb, Bi, Sb, P, B, Al, and As; x represents a number of from 0 to 4; and y represents a number of from 1 to 10.

(16) A nonaqueous secondary battery described in (10) above, which is characterized in that the negative electrode active material of (10) above is represented by formula (2):

$$SnM^2_zO_y \quad (2)$$

wherein $M^2$ represents one or more metal(s) in which at least one of the metal(s) is selected from the group consisting of Ge, Pb, Bi, Sb, P, B, Al, and As; z represents a number of from 0 to 4; and y represents a number of from 1 to 10.

(17) A nonaqueous secondary battery described in (10) above, which is characterized in that the negative electrode active material of (10) above is represented by formula (3):

$$SnSi_pM^2_qO_r \quad (3)$$

wherein $M^2$ represents one or more metal(s) in which at least one of the metal(s) is selected from the group consisting of Ge, Pb, Bi, Sb, P, B, Al, and As; and $0.1 \leq p+q \leq 4$, $0.05 \leq p \leq 2$, $1.1 \leq r \leq 10$.

(18) A process for producing a negative electrode sheet for the nonaqueous secondary battery described in (1) above, which is characterized in that the water-dispersion electrode material mixture paste used in the negative electrode has a pH of 5 to 10.

(19) A process for producing a negative electrode sheet for the nonaqueous secondary battery described in (18) above, which is characterized in that the water-dispersion electrode material mixture paste used in the negative electrode has a pH of 6 to 9.

(20) A process for producing a negative electrode sheet for the nonaqueous secondary battery described in (18) or (19) above, which is characterized in that the water-dispersion paste used in the negative electrode is maintained at a temperature of not lower than 5° C. to lower than 80° C.

(21) A process for producing a negative electrode sheet for the nononaqueous secondary battery described in any one of (18) to 20) above, which is characterized in that the water-disperion paste is applied to the current collector within 7 days the preparation.

(22) A process for producing a negative electrode sheet for the nononaqueous secondary battery described in any one of (18) to 21) above, which is characterized in that the thickness of the electrode material mixture on one side of the negative electrode is 10 to 80 μm and that of the positive electrode is 100 to 170 μm.

Figure 1:
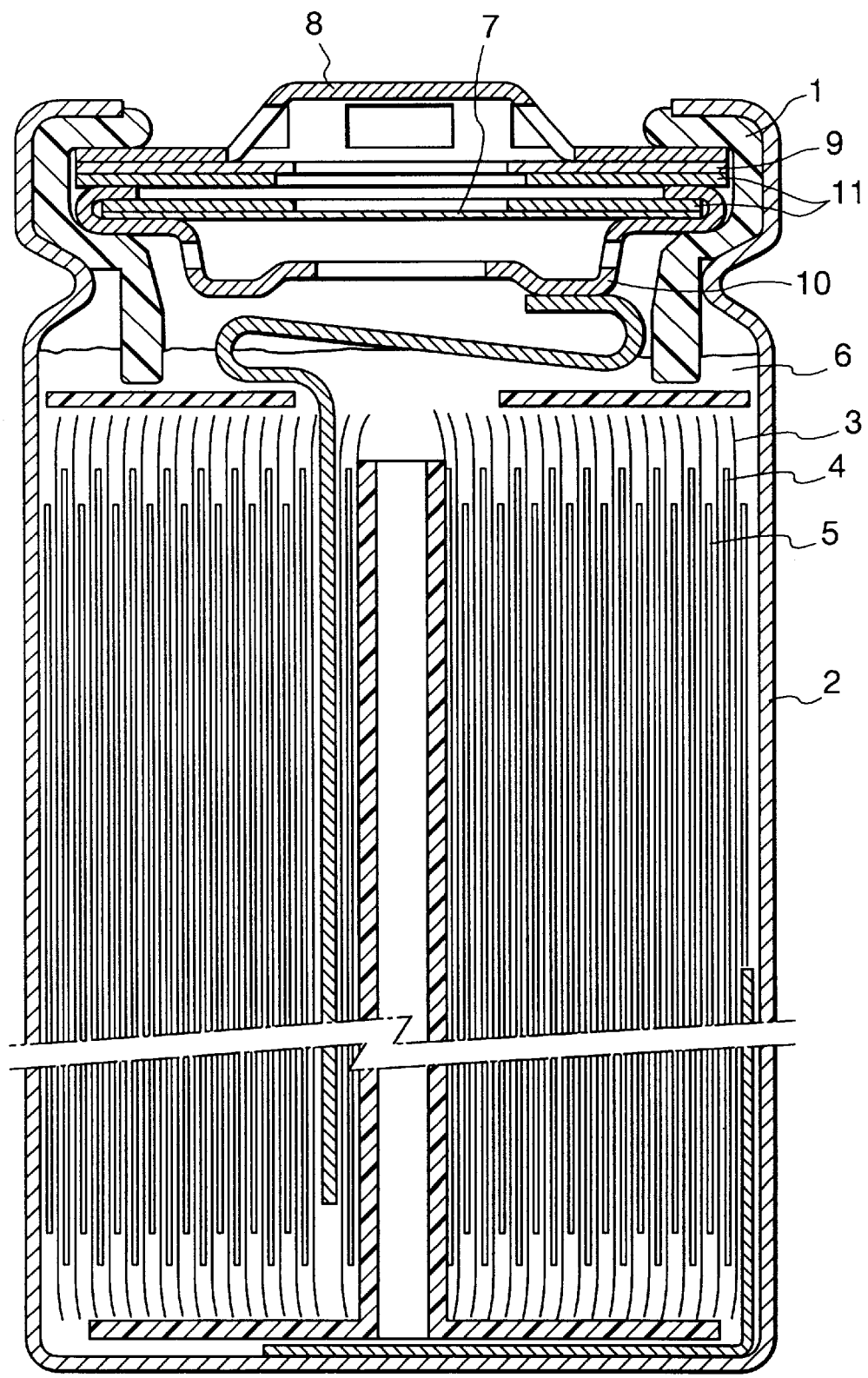
FIG. 1 is a cross section of a cylindrical battery prepare in Examples.

1 . . . Insulating sealant made of polypropylene
2 . . . Negative electrode case (battery case) also serving as a negative electrode terminal
3 . . . Separator
4 . . . Negative electrode sheet
5 . . . Sheet of positive electrode material mixture
6 . . . Electrolytic solution
7 . . . Safety valve
8 . . . Positive electrode terminal
9 . . . PTC element
10 . . . Sealing plate
11 . . . Insulating ring

THE BEST MODE FOR CARRYING OUT THE INVENTION

The technique of the present invention will be described below in detail. The positive and negative electrodes used in the nonaqueous secondary battery of the invention, particularly those of sheet form are prepared by applying a water-dispersion paste of a positive or negative electrode material mixture to a current collector. In addition to a positive active material or a negative electrode material each of which is capable of intercalating and deintercalating lithium, the positive or negative electrode material mixture can contain a (electric) conducting agent, a binder, a dispersion aid, a filler, an ion-conductive agent, a pressure increasing agent, and other additives.

The water-dispersion paste of an electrode material mixture may be prepared by any of a method comprising adding the components to water all at once and stirring, a method comprising previously dispersing a dispersion aid in water and adding a (electric) conducting agent thereto followed by stirring, and a method comprising previously mixing a (electric) conducting agent and a dispersion aid and then dispersing the mixture in water. A preferred method comprises previously mixing or kneading a (electric) conducting agent with a liquid dispersion aid or a highly concentrated dispersion aid solution and then dispersing the mixture in water.

Mixing, kneading or dispersion in water of a (electric) conducting agent and a dispersion aid can be carried out by means of an appropriately selected mixing agitator, such as a kneader, a mixer, a homogenizer, a dissolver, a planetary mixer, a paint shaker, and a sand mill.

Examples of the (electric) conducting agent comprising a carbonaceous compound which can be used in the invention includes natural graphite, such as scale graphite, flake graphite, and lumpy graphite; artificial graphite; carbon black, such as channel black, furnace black, lamp black, thermal black, acetylene black, and Ketjen black; and carbon fiber. Carbon black is preferred, with acetylene black being still preferred.

All these carbonaceous compounds are hydrophobic and are difficult to be made into a water-dispersion paste. For example, while acetylene black is a satisfactory (electric) conducting agent for its excellent electric conductivity and permeability to an electrolyte, it has poor wettability with water and difficulty in dispersing together with an active material into a water-dispersion paste as long as a commonly adopted process for preparing electrodes is followed. Further, although furnace black or graphite is more dispersible in an organic solvent, it is strongly coherent in water and does not exhibit sufficient water dispersibility. JP-A-2-158055 discloses a method for preparing a coating paste of an electrode material mixture, in which a carbon powder (electric) conducting agent is previously mixed with a manganese dioxide active material to once obtain a mixed powder. When this method is adopted, however, since the (electric) conducting agent is seriously inferior to the active material in water dispersibility, the dispersal of the (electric) conducting agent is still insufficient even with the active material being in a sufficiently dispersed state, and part of the (electric) conducting agent forms agglomerates in the dispersion paste.

Accordingly, it is advantageous to use the carbonaceous compound as a (electric) conducting agent in the form of a water-dispersion previously prepared together with a dispersion aid according to the present invention.

Examples of the dispersion aid which can be used in the invention for dispersion of a carbonaceous compound includes fatty acids having 6 to 22 carbon atoms (e.g., caproic acid, caprylic acid, lauric acid, myristic acid, palmitic acid, stearic acid, behenic acid, oleic acid, elaidic acid, linoleic acid, linolenic acid, and stearolic acid); metallic soaps composed of the above-mentioned fatty acids and alkali metals (e.g., Li, Na, and K) or alkaline earth metals (e.g., Mg, Ca, and Ba); aliphatic amines; coupling agents, such as silane coupling agents and titanium coupling agents; higher alcohols; polyalkylene oxide phosphoric acid esters; alkylphosphoric acid esters; alkylboric acid esters; sarcosinates; polyalkylene oxide esters; lecithin; nonionic surface active agents, such as alkylene oxide derivatives and glycerol derivatives; cationic surface active agents, such as higher alkylamines, quaternary ammonium salts, and phosphonium or sulfonium salts; anionic surface active agents having a carboxyl acid, sulfo acid, phospho acid, sulfuric acid ester or phosphoric acid ester group; amphoteric surface active agents, such as amino acids, aminosulfonic acids, and amino-alcohol sulfuric acid or phosphoric acid esters; and water-soluble polymers, such as carboxymethyl cellulose, hydroxyethyl cellulose, hydroxypropyl cellulose, polyacrylic acid, polyvinyl alcohol, modified polyvinyl alcohol, polyacrylamide, polyhydroxy-(meth)acrylates, and styrene-maleic acid copolymers. Preferred of them are water-soluble polymers for their particularly satisfactory dispersing ability for (electric) conducting agents comprising carbonaceous compounds. Of the above water-soluble polymers, carboxymethyl cellulose, polyvinyl alcohol, modified polyvinyl alcohol, and styrene-maleic acid copolymers are particularly preferred. These dispersion aids may be used either individually or as a mixture of two or more thereof.

Dispersion of a carbonaceous compound as a (electric) conducting agent in water can be conduced by means of a well-known dispersing machine (e.g., a mixer or a homoblender) and a well-known dispersing method.

The (electric) conducting agent dispersion can be used for preparation of either electrode sheet, preferably both positive and negative electrodes to constitute a battery.

The carbonaceous compounds can be used either individually or as a mixture of two or more thereof as a (electric) conducting agent. In addition to the carbonaceous compound of the invention, electric conducting fibers, such as metallic fibers; powdered metals, such as copper, nickel, aluminum, and silver; electric conducting whiskers, such as zinc oxide and potassium titanate; electric conducting metal oxides, such as titanium oxide; and organic (electric) conducting materials, such as polyphenylene derivatives may also be used in combination, either individually or as a mixture thereof.

While not limiting, the (electric) conducting agent comprising the carbonaceous compound used is preferably used in an amount of 1 to 50% by weight, still preferably 2 to 30% by weight, based on the electrode material mixture. While not limiting, the dispersion aid is preferably used in an amount of 1 to 50% by weight, still preferably 2 to 20% by weight, based on the (electric) conducting agent. If the amount of the (electric) conducting agent or the dispersion aid is too large, the electrode volume would increase, which leads to reduction of capacity per unit electrode volume or weight. If it is too small, the electric conductivity or dispersibility of the (electric) conducting agent would be reduced to decrease the capacity.

Where the carbonaceous compound(-electric) conducting agent is used in combination with other (electric) conducting agents, the total amount of the conducting agents preferably falls within the above range.

As previously stated, compounds capable of intercalating and deintercalating lithium are not always stable in water. In particular, where a lithium-containing transition metal compound or inorganic oxide is used as a negative electrode material, the material dissolves or undergoes change of the surface condition in a low or high pH region, which results in impairment of charge and discharge characteristics of a nonaqueous secondary battery, such as a discharge capacity and a cycle life. In the case of, in particular, using an amorphous negative electrode material having excellent charge and discharge characteristics, the inventors have ascertained that partial crystallization occurs on the surface under the above-mentioned pH condition, which impairs the excellent characteristics of the negative electrode material.

It was hence found that a nonaqueous secondary battery having excellent charge and discharge characteristics such as discharge capacity and cyclic life can be obtained by properly adjusting the pH of a water-dispersion electrode material mixture paste which is prepared for the preparation of a negative electrode. The pH of a water-dispersion electrode material mixture paste varies depending on the kinds and amounts of the components and additives present therein, i.e., a negative electrode material, a (electric) conducting agent, a binder, a dispersant (aid), a filler, an ion-conductive agent, a pressure increasing agent, and the like. Therefore, a water-dispersion electrode material mixture paste can be adjusted to a preferred pH by appropriate selection of these conditions, thereby providing an aqueous secondary battery with excellent charge and discharge characteristics. A preferred pH range is from 5 to 10, still preferably from 5.5 to 9.5, particularly preferably from 6 to 9.

The pH of a water-dispersion electrode material mixture paste can also be adjusted by addition of a pH adjustor. The pH adjustor may be added either simultaneously with the components of the electrode material mixture or after the preparation of the electrode material mixture.

Inorganic or organic acids or alkalis can be used as a pH adjustor. Examples of acid-pH adjustors include sulfuric acid, hydrochloric acid, nitric acid, acetic acid, tartaric acid, and formic acid. Examples of alkali-pH adjustors are lithium hydroxide, sodium hydroxide, potassium hydroxide, calcium hydroxide, lithium carbonate, sodium carbonate, sodium hydrogencarbonate, and ammonia.

In order to keep the negative electrode material stable, it is preferable for the water-dispersion electrode material mixture paste to be kept away from high temperatures from its preparation till coating. Too low a temperature is not favorable because the coating properties of the electrode material mixture would be deteriorated. A preferred temperature range is from 5 to 80° C., still preferably 5 to 50° C.

In order to maintain the negative electrode material stable, it is also preferred for the water-dispersion electrode material mixture paste not to be allowed to stand for a long time from its preparation till coating. A preferred storage time is within 7 days, still preferably within 4 days.

In the present invention, in order to prevent a load from being imposed on either one of positive and negative electrodes, which might cause reduction in charge and discharge cycle life, the thickness of the electrode material mixture on one side of the negative electrode is preferably 5 to 80 μm, and that of the electrode material on one side of the positive electrode is preferably 90 to 180 μm at the time of battery assembly. Still preferably, the former is 10 to 80 μm, while the latter is 100 to 180 μm.

Examples of the compound capable of intercalating and deintercalating lithium which can be used in the negative electrode sheet (hereinafter simply referred to as a negative electrode material) preferably includes a carbonaceous compound, an inorganic oxide, an inorganic chalcogenide, and an organic high polymer. These negative electrode materials can be used either individually or as a combination thereof. For example, a combination of a carbonaceous compound and an inorganic oxide may be mentioned as an example. The above-described negative electrode materials are preferred, since they bring about such effects as a high capacity, a high discharge potential, high safety, and excellent cyclic properties.

The carbonaceous compound is selected from natural graphite, artificial graphite, vapor phase growth-carbon, carbon of calcined organic substances, or the like, with those having a graphite structure being preferred. The carbonaceous compound may contain, in addition to carbon, 0 to 10% by weight of compounds of other elements, e.g., B, P, N, S, SiC and $B_4C$.

Elements which constitute the inorganic oxide or inorganic chalcogenide include transition metals or the metals and semimetals belonging to the groups 13 to 15 of the Periodic Table.

Examples of the preferred transition metal compounds include an oxide, a composite oxide or a chalcogenide of V, Ti, Fe, Mn, Co, Ni, Zn, W, and Mo. Still preferred compounds are $Li_pCO_qV_{1-q}O_r$, wherein p=0.1 to 2.5, q=0 to 1; and r=1.3 to 4.5, disclosed in JP-A-6-44972.

Examples of the organic high polymers include those which can be doped with lithium ions, i.e., polyacene, polyacetylene, polypyrrole, and derivatives thereof.

The negative electrode materials which can be preferably used in the invention are inorganic oxides or inorganic chalcogenides containing an element of the groups 13 to 15 of the Periodic Table. Examples of the elements of the groups 13 to 15 of the Periodic Table are B, Al, Ga, In, Tl, C, Si, Ge, Sn, Pb, N, P, As, Sb, and Bi.

Examples of these compounds include GeO, $GeO_2$, SnO, SnS, $SnO_2$, $SnS_2$, GeS, $GeS_2$, InS, PbO, PbS, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_5InO$.

It is preferable that these composite chalcogen compounds and composite oxides are predominantly amorphous at the time of battery assembly. The terminology "predominantly amorphous" as used herein means that a substance has a broad scattering band having a peak at 20 to 40° in terms of 2θ in X-ray diffractometry using CuKα rays. Also the substance may have a diffraction line assigned to a crystalline structure. It is preferable that the maximum intensity of the band assigned to a crystalline structure which appears at 40 to 70° in terms of 2θ is not higher than 500 times, still preferably not higher than 100 times, particularly preferably not higher than 5 times, the peak intensity of the broad scattering band which appears at 20 to 40° in terms of 2θ. It is most preferred that the compound has no diffraction line attributed to a crystalline structure.

Of the above-mentioned composite oxides and composite chalcogen compounds, those represented by formulae (1) and (2) shown below are still preferred.

$$SnM^1_xO_y \quad (1)$$

wherein $M^1$ represents one or more metal(s) in which at least one of the metal(s) is selected from the group consisting of Si, Ge, Pb, Bi, Sb, P, B, Al, and As; x represents a number of from 0 to 4; and y represents a number of from 1 to 10.

$$SnM^2_zO_y \quad (2)$$

wherein $M^2$ represents one or more metal(s) in which at least one of the metal(s) is selected from the group consisting of Ge, Pb, Bi, Sb, P, B, Al, and As; z represents a number of from 0 to 4; and y represents a number of from 1 to 10.

Of the compounds of formula (1), those represented by formula (3) are still preferred.

$$SnSi_pM^2_qO_r \quad (3)$$

wherein $M^2$ is the same as defined above in formula (2); and $0.1 \leq p+q \leq 4$, $0.05 \leq p \leq 2$, $1.1 \leq r \leq 10$.

Specific but non-limiting examples of the composite oxides represented by formulae (1) to (3) are shown below.

$SnSi_{0.01}O_{1.02}$, $SnGe_{0.01}O_{1.02}$, $SnPb_{0.05}O_{1.1}$, $SnSi_{0.1}Ge_{0.1}Pb_{0.1}O_{2.6}$, $SnSi_{0.2}Ge_{0.1}O_{2.6}$, $SnSi_{0.7}O_{2.4}$, $SnGe_{0.7}O_{2.4}$, $SnSi_{0.iA2.6}SnSiO_3$, $SnPbO_3$, $SnSi_{0.9}Ge_{0.1}O_3$, $SnSi_{0.8}Ge_{0.2}O_3$, $SnSi_{0.8}Pb_{0.2}O_3$, $SnSi_{0.8}Ge_{0.1}Pb_{0.1}O_3$, $SnSi_{1.2}O_{3.4}$, $Sni_2O_6$, $SnB_{0.01}O_{1.015}$, $SnAl_{0.01}O_{1.015}$, $SnP_{0.01}O_{2.015}$, $SnP_{0.05}O_{1.125}$, $SnB_{0.05}O_{1.075}$, $SnP_{0.1}O_{1.25}$, $SnB_{0.01}O_{1.15}$, $SnP_{0.3}O_{1.75}$, $SnB_{0.7}O_{2.05}$, $SnP_{0.8}O_3$, $SnPO_{3.5}$, $SnBO_{2.5}$, $SnSi_{0.25}P_{0.2}B_{0.2}O_3$, $SnSi_{0.5}P_{0.2}B_{0.2}O_3$, $SnSi_{0.8}P_{0.2}O_{3.1}$, $SnSi_{0.8}B_{0.2}O_{2.9}$, $SnSi_{0.8}Al_{0.2}O_{2.9}$ $SnSi_{0.6}Al_{0.2}B_{0.2}O_{2.8}$, $SnSi_{0.6}Al_{0.2}P_{0.2}O_3$, $SnSi_{0.6}B_{0.2}P_{0.2}O_3$, $SnSi_{0.4}Al_{0.2}B_{0.4}O_{2.7}$, $SnSi_{0.6}Al_{0.1}B_{0.1}P_{0.3}O_{3.25}$, $SnSi_{0.6}Al_{0.1}B_{0.3}P_{0.1}O_{3.05}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.8}Al_{0.3}B_{0.2}P_{0.2}O_{3.85}$.

Where the compound represented by formula (1), (2) or (3) is used as a main negative electrode material, the nonaqueous secondary battery of the invention has more excellent charge and discharge cycle characteristics, a high discharge potential, a high capacity, high safety, and excellent rapid charge characteristics. Particularly excellent effects can be obtained where a compound containing Sn in which Sn is present with divalency is used as a negative electrode material. The valency of Sn can be determined by chemical titration. For example, the analysis can be made in accordance with the method described in *Physics and Chemistry of Glasses*, Vol. 8, No. 4, p. 165 (1967). The valency of Sn can also be decided from the Knight Sift in the solid nuclear magnetic resonance spectrum of Sn. For example, in broad-line NMR measurement, metallic Sn (zero valent Sn) shows a peak in an extremely low magnetic field in the vicinity of 7000 ppm with reference to $Sn(CH_3)_4$, whereas the peak of SnO (divalent Sn) appears around 100 ppm, and that of $SnO_2$ (tetravalent Sn) appears around –600 ppm. Like this, the Knight Sift largely depends on the valency of the center metal, Sn, with the ligands being the same. The valency can thus be determined by the peak position obtained by $^{119}$Sn-NMR analysis.

The negative electrode material of the invention may contain various compounds, such as compounds of the group 1 elements (e.g., Li, Na, K, Rb, and Cs), the group 2 elements (e.g., Be, Mg, Ca, Sr, and Ba), transition metals (e.g., Sc, Ti, V, Cr, Mn, Fe, Co, Ni, Cu, Zn, Y, Zr, Nb, Mo, Tc, Ru, Rh, Pd, Ag, Cd, lanthanide metals, Hf, Ta, W, Re, Os, Ir, Pt, Au, and Hg), and the group 17 elements (e.g., F, Cl, Br, and I). The negative electrode material can also contain various compounds as a dopant affording electron conductivity (e.g., Sb, In or Nb compounds). The total amount of these compounds added is preferably 0 to 20 mol %.

The composite chalcogen compound and composite oxides represented by formulae (1) to (3) can be synthesized by a. calcination method or a solution method. A calcination method is preferred.

A calcination method is explained below.

Calcination is carried out preferably at a rate of temperature rise of 40 to 2000° C./min, still preferably 6° to 2000° C./min, particularly preferably 10° to 2000° C./min; at a calcination temperature of 250° to 1500° C., still preferably 350° to 1500° C., particularly preferably 500° to 1500°C.; for a calcination period of 0.01 to 100 hours, still preferably 0.5 to 70 hours, particularly preferably 1 to 20 hours. After calcination, the system is cooled preferably at a rate of temperature drop of 2 to $10^{7°}$ C./min, still preferably 4 to $10^{7°}$ C./min, still more preferably 6 to $10^{7°}$ C./min, particularly preferably 10 to $10^{7°}$ C./min.

The term "rate of temperature rise" as used herein means an average rate of temperature rise of from 50% of the calcination temperature (° C.) to 80% of the calcination temperature (° C.), and the term "rate of temperature drop" as used herein means an average rate of temperature drop of from 80% of the calcination temperature (° C.) to 50% of the calcination temperature (° C.).

Cooling of the calcined product may be effected either within a calcining furnace or out of the furnace, for example, by pouring the product into water. Super-quenching methods described in *Ceramics Processing*, p. 217, Gihodo (1987), such as a gun method, a Hammer-Anvil method, a slap method, a gas atomizing method, a plasma spray method, a centrifugal quenching method, and a melt drag method, can also be used. Further, cooling may be conducted by a single roller method or a twin-roller method described in *New Glass Handbook*, p. 172, Maruzen (1991). Where the material melts during calcination, the calcined product may be withdrawn continuously while feeing the raw materials to the furnace. The melt is preferably stirred during calcination.

The calcining atmosphere preferably has an oxygen content of not more than 5% by volume. An inert gas atmosphere is still preferred. Examples of the inert gas includes nitrogen, argon, helium, krypton, and xenon.

The negative electrode active material of the invention preferably has an average particle diameter (D) of from 0.7 to 25 μm, with the particle diameter of at least 60% by volume of the total particles falling within a range of from 0.5 to 30 μm. Still preferably, the average particle diameter (D) is 0.8 to 20 μm, and at least 75% by volume of the total particles are from 0.5 to 30 μm. Particularly preferably, the average particle diameter (D) is 1.0 to 16 μm, and at least 90% by volume of the total particles are from 0.5 to 30 μm. It is needless to say that the particle diameter of the negative electrode active material used should not exceed the thickness of the electrode material mixture on one side of the negative electrode.

The term "average particle diameter" as used herein means a median size of primary particles, which can be measured with a laser diffraction type particle size distribution measuring apparatus.

It is preferable that the ratio of a group of negative material particles having a particle diameter of 1 μm or smaller is not more than 30% by volume of the total particles and the ratio of a group of the particles having a particle diameter of 20 μm or greater is not more than 25% by volume of the total particles. It is still preferable that the former ratio is not more than 20%, and the latter ratio is not more than 14%, each based on the total particle volume. It is particularly preferable that the former ratio is not more than 10%, and the latter ratio is not more than 10%, each based on the total particle volume.

The negative electrode active material of the invention preferably has a specific surface area of 0.1 to 10 $M^2$/g, still preferably 0.1 to 8 $m^2$/g, particularly preferably 0.2 to 7 $m^2$/g, as can be measured by a general BET method.

The calcined product or roughly crushed calcined product can be adjusted to a prescribed size by grinding and/or classification. Grinding can be carried out by dry grinding or wet grinding using a solvent as a grinding medium. From the standpoint of handling properties and safety, examples of the preferred solvents for use in wet grinding include water, toluene, xylene, methanol, ethanol, n-propanol, isopropyl alcohol, isobutyl alcohol, acetone, methyl ethyl ketone, butyl acetate, and N,N-dimethylformamide. The solvent is preferably used in an amount ⅟10 to 20 times, still preferably ⅕ to 10 times, the amount of the powdered material. Grinding is preferably effected by dry grinding and/or wet grinding using water as a medium. Examples of the useful grinding machines include a mortar, a ball mill, a circular vibration mill, a spin vibration mill, a satellite ball mill, a planetary ball mill, spinning air flow type jet mill, a pot mill, a centrifugal mill, a tower mill, a sand mill, an attritor, a centrimill, a dynomill, a roller mill, a pin mill, a tube mill, a rod mill, and a jaw crusher. Grinding by means of a spinning air flow type jet mill, a ball mill or a vibration ball mill is preferred. In order to adjust to a prescribed size, the ground particles are preferably classified. For classification, an air classifier (e.g., a cyclone), a sieve, etc. can be used for preference. Classification by means of a sieve is preferably carried out in a dry process or a wet process using a solvent, such as water. Grinding and/or classification are preferably conducted at a temperature of 5 to 150° C., still preferably 10 to 90° C., while varying depending on the kinds of the material and the solvent used.

It is preferable for improvement of battery capacity that the negative electrode active material of the invention be subjected to heat treatment at a temperature range of from 100 to 400° C. before it is formulated into an electrode material mixture. The heat treatment is performed in any atmosphere, for example in air, an inert gas atmosphere (e.g., argon gas, nitrogen gas or helium gas) or an active gas atmosphere, such as oxygen gas or hydrogen gas, or under pressure or reduced pressure. A preferred atmosphere is air, inert gas, or under reduced pressure. The expression "before it is formulated into an electrode material mixture" as used above is intended to mean the stage before the negative electrode active material is mixed with, for example, a binder or a (electric) conducting agent. In other words, the negative electrode active material alone is subjected to heat treatment. The time for conducting the heat treatment is preferably from 90 days before formulation into an electrode material mixture till "immediately before formulation", still preferably from 30 days before formulation till "immediately before formulation". The heat treatment is preferably carried out at a temperature of 120 to 350° C., still preferably 150 to 300° C., for a period of 0.5 to 120 hours, still preferably 1 to 80 hours, particularly preferably 1 to 48 hours.

The positive electrode active material which can be used in the positive electrode sheet in the present invention is not particularly limited as long as it is capable of intercalating and deintercalating lithium ions. In particular, it is selected from transition metal oxides or transition metal chalcogenides. Transition metal oxides are preferred, and those containing lithium are particularly preferred.

Examples of transition metals which can be preferably used in the invention include Ti, V, Cr, Mn, Fe, Co, Ni, Cu, Nb, Mo, and W. Of the compounds of these transition metals, preferred are manganese dioxide, vanadium tetroxide, iron oxide, molybdenum oxide, molybdenum sulfide, cobalt oxide, iron sulfide, and titanium sulfide. These compounds may be used either individually or as a combination of two or more thereof. They can be used in the form of a lithium-containing transition metal oxide.

The lithium compound or transition metal compound may be calcined as a mixture with a compound improving ion conductivity, such as a $Ca^{2+}$ compound, or a compound containing P, B or Si and capable of forming an amorphous network (e.g., $P_2O_5$, $Li_3PO_4$, $H_3BO_3$, $B_2O_3$, or $SiO_2$). It may also be mixed and calcined with a compound containing an alkali metal ion (e.g., Na, K or Mg) and/or a compound containing Si, Sn, Al, Ga, Ge, Ce, In, or Bi. The lithium-containing transition metal oxides can be synthesized by, for example, calcining a mixture of a lithium compound and a transition metal compound.

Specific examples of preferred positive electrode active materials for use in the invention are described in JP-A-61-5262, U.S. Pat. No. 4,302,518, JP-A-63-299056, JP-A-1-294364, JP-B-4-30146 (the term "JP-B" as used herein means an "examined Japanese patent publication"), U.S. Pat. Nos. 5,240,794 and 5,153,081, JP-A-4-328258, and JP-A-5-54889. Typical compounds are shown below for illustrative purposes only but not for limitation.

$Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$, $Li_xMn_bFe_{1-b}O_z$, $Li_xCo_cB_{1-c}O_2$ (wherein x=0.05 to 1.2; a=0.1 to 0.9; b=0.8 to 0.98; c=0.85 to 0.99; and z=1.5 to 5).

The positive electrode active material to be used in the invention can be synthesized by a method comprising mixing and calcining a lithium compound and a transition metal compound or a method comprising a solution reaction. A calcination method is preferred.

The details of calcination are described in JP-A-6-60867 (para. 0035) and JP-A-7-14579. These methods can be used. The positive electrode active material obtained by calcination may be used after washing with water, an aqueous acid solution, an aqueous alkali solution, or an organic solvent.

Chemical insertion of lithium ions into a transition metal oxide may be conducted by reacting metallic lithium, a lithium alloy or butyl lithium with a transition metal oxide.

While not limiting, the positive electrode active material of the invention preferably has an average particle diameter of from 0.1 to 50 μm, and the volume of the particles having a particle diameter of from 0.5 to 30 μm preferably occupies 95% or more by volume of the total particle volume. More specifically, it is preferable that the ratio of a group of particles of 3 μm or smaller is not more than 18% by volume of the total particles and the ratio of a group of particles of 15 to 25 μm is not more than 18% by volume of the total particles. It is still preferable that the former ratio is not more than 17%, and the latter ratio is not more than 7%, each based on the total particle volume. It is particularly preferable that the former ratio is not more than 16%, and the latter ratio is not more than 2%, each based on the total particle volume.

The particle size distribution in terms of volume cumulative distribution is preferably D(25%)=3 to 7 μm, D(50%)=4 to 9 μm, D(75%)=5 to 12 μm, and D(90%)=6 to 13 μm; still preferably D(25%)=3 to 5 μm, D(50%)=4 to 7 μm, D(75%)=5 to 8 μm, D(90%)=6 to 9 μm; particularly preferably D(25%)=3 to 5 μm, D(50%)=4 to 6 μm, D(75%)=5 to 7 μm, and D(90%)=6 to 9 μm.

It is desirable that the positive electrode active material of the invention has substantially no particle size distribution at 1 μm or smaller to 25 μm or greater. The term "substantially no particle size distribution" as used here means that the volume ratio of the particles of 1 μm or smaller or that of the particles of 25 μm or greater is not more than 3%. It is still preferable that the volume ratio of the particles of 25 mm or greater is not more than 2%. It is particularly preferable that the volume ratio of the particles of 1 μm or smaller or that of the particles of 25 μm or greater is 0%.

While the specific surface area of the positive electrode active material is not particularly limited, it is preferably 0.01 to 50 $M_2$/g, still preferably 0.1 to 20 $m_2$/g, still more preferably 0.1 to 5 $m^2$/g, particularly preferably 0.2 to 1 $m_2$/g, in terms of BET specific surface area.

When 5 g of the positive electrode active material is dissolved in 100 ml of distilled water, the pH of the supernatant liquid is preferably 7 to 12.

Where the positive electrode active material is obtained by calcination, the calcination is preferably carried out at 500 to 1500° C., still preferably 700 to 1200° C., particularly preferably 750 to 1000° C., for a calcination time of 4 to 30 hours, still preferably 6 to 20 hours, particularly preferably 6 to 15 hours.

The surface of the oxide as a positive electrode active material or the negative electrode material can be coated with an oxide having a different chemical formula from the positive electrode active material or the negative electrode material. The surfacing oxide is preferably one containing a compound soluble in both an acidic solution and an alkaline solution. It is still preferably a metal oxide having high electron conductivity. Examples of the metal oxides include $PbO_2$, $Fe_2O_3$, $SnO_2$, $In_2O_3$, and ZnO. It is also preferable to incorporate a dopant (e.g., a metal of different valence as an oxide, a halogen atom, etc.) into these oxides. Particularly preferred of them are $SiO_2$, $SnO_2$, $Fe_2O_3$, ZnO, and $PbO_2$.

The amount of the surface-treated metal oxide is preferably 0.1 to 10% by weight, still preferably 0.2 to 5% by weight, particularly preferably 0.3 to 3% by weight, per positive electrode active material or the negative electrode material.

The surface of the positive electrode active material or the negative electrode material may be modified by treating with, for example, an esterifying agent, a chelating agent, a (electric) conducting high polymer, polyethylene oxide, and the like.

The surface of the negative electrode material may also be modified by, for example, providing a layer comprising an ion-conductive polymer or polyacetylene. The positive electrode active material or the negative electrode material may be subjected to a purification processing, such as washing with water.

The binder which can be used in the water-dispersion paste of the invention includes polysaccharides, thermoplastic resins, and rubbery polymers or mixtures thereof. Examples of suitable binders include starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene terpolymers (EPDM), sulfonated EPDM, styrene-butadiene rubbers, polybutadiene, fluorine rubbers, and polyethylene oxide. In using a compound having a functional group reacting with lithium, such as a polysaccharide, it is preferable to deactivate the functional group by addition of a compound having, for example, an isocyanate group. While not limiting, the binder is preferably used in an amount of 1 to 50% by weight, still preferably 2 to 30% by weight. The distribution of the binder in the electrode material mixture may be either uniform or non-uniform.

In particular, polymers having a decomposition temperature of 300° C. or above are preferred as a binder. The terminology "decomposition temperature" as used herein means a temperature in some range in which a polymer reduces its weight upon being heated in vacuo. For example, the decomposition temperature of polyethylene is from 335 to 450° C. In order to make an accurate examination of the thermal stability of polymers, S. L. Madorsky et al. isothermally decomposed a polymer in vacuo by means of a thermobalance to obtain the relation between the rate of weight reduction after 30 minutes' heating and the heated temperature, and obtained a half-life temperature (Th) at which the rate of weight reduction reaches 50% (see, e.g., S.P.E.J., Vol. 17, p. 665 (1961)). According to the report, the Th of polyethylene as above referred to is 406° C. The term "decomposition temperature" as used in the invention corresponds to the Th.

Polymers having a decomposition temperature (Th) of 300° C. or higher and suitable for use as a binder in the invention include polyethylene, polypropylene, epoxy resins, polyester resins, and fluorine resins, with fluorine resins being particularly preferred. The term "fluorine resin" is used herein as a general term for polymers having a carbon-fluorine bond in the molecule thereof as specified in JIS 6900 "Plastic Terms".

Suitable examples of the fluorine resins are shown below.
(A-1) Polytetrafluoroethylene (PTFE)
(A-2) Polyvinylidene fluoride (PVDF)
(A-3) Tetrafluoroethylene-hexafluoropropylene copolymer (FEP)
(A-4) Tetrafluoroethylene-perfluoroalkyl vinyl ether copolymer (PFA)
(A-5) Vinylidene fluoride-hexafluoropropylene copolymer
(A-6) Vinylidene fluoride-chlorotrifluoroethylene copolymer
(A-7) Ethylene-tetrafluoroethylene copolymer (ETFE resin)
(A-8) Polychlorotrifluoroethylene (PCTFE)
(A-9) Vinylidene fluoride-pentafluoropropylene copolymer
(A-10) Propylene-tetrafluoroethylene copolymer
(A-11) Ethylene-chlorotrifluoroethylene copolymer (ECTFE)
(A-12) Vinylidene fluoride-hexafluoropropylene-tetrafluoroethylene copolymer
(A-13) Vinylidene fluoride-perfluoromethyl vinyl ether-tetrafluoroethylene copolymer Copolymer resins comprising monomer units constituting the polymers listed above and another ethylenically unsaturated monomer unit are also useful. Specific but non-limiting examples of copolymerizable ethylenically unsaturated monomers include acrylic esters, methacrylic esters, vinyl acetate, acrylonitrile, acrylic acid, methacrylic acid, maleic anhydride, butadiene, styrene, N-vinylpyrrolidone, N-vinylpyridine, glycidyl methacrylate, hydroxyethyl methacrylate, and methyl vinyl ether.

The filler to be used in the invention is not particularly limited as long as it is a fibrous material which undergoes no chemical change in an assembled battery. Fibers of polyolefins (e.g., polypropylene or polyethylene), glass fiber, and carbon fiber are usually used. While not limiting, the filler is preferably used in an amount of 0 to 30% by weight.

Compounds known as inorganic or organic solid electrolyte can be used as an ion-conductive agent in the invention. The particulars are described later with respect to an electrolytic solution. The pressure increasing agent used in the invention is a compound capable of increasing the inner pressure as hereinafter described. Carbonates may be mentioned as a typical example.

The electrolyte used in the invention is generally made up of a solvent and a lithium salt (composed of an anion and a lithium cation) soluble in the solvent. Examples of suitable solvents include aprotic organic solvents, such as propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethyl sulfoxide, dioxolane (e.g., 1,3-dioxolane), formamide, dimethylformamide, acetonitrile, nitromethane, methyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone. These solvents may be used either individually or as a mixture of two or more thereof. Examples of suitable anions of the lithium salts soluble in these solvents include $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^{2-}$, $(1,2\text{-dimethoxyethane})_2ClO_4^-$, lower aliphatic carboxylate ions, $AlCl_4^-$, $Cl^-$, $Br^-$, $I^-$, anions of chloroboran compounds, and tetraphenylborate ions. These lithium salts may be used either individually or as a combination of two or more thereof. In particular, the electrolytic solution preferably contains a cyclic carbonate and/or an acyclic carbonate, such as diethyl carbonate, dimethyl carbonate, or methyl ethyl carbonate. The electrolytic solution preferably contains ethylene carbonate or propylene carbonate. The electrolytic solution preferably comprises an electrolyte containing $LiCF_3SO_3$, $LiClO_4$, $LiBF_4$ and/or $LiPF_6$ and a mixed solvent of ethylene carbonate and propylene carbonate, 1,2-dimethoxyethane, dimethyl carbonate or diethyl carbonate at an appropriate mixing ratio. A supporting salt containing $LiPF_6$ is particularly preferred.

The amount of the electrolytic solution to be used in a battery is not particularly limited and can be selected according to the amounts of the positive electrode active material and the negative electrode material or the size of the battery.

While not limiting, the concentration of the supporting electrolyte is preferably from 0.2 to 3 mol per liter of the electrolytic solution.

In addition to the above-mentioned electrolytic solution, inorganic or organic solid electrolytes may also be employed.

Solid electrolytes are divided into inorganic solid electrolytes and organic solid electrolytes.

Examples of suitable inorganic solid electrolytes include lithium nitride, a lithium halide, and a lithium oxyacid salt. Among them, $Li_3N$, $LiI$, $Li_5NI_2$, $Li_3N-LiI-LiOH$, $Li_4SiO_4$, $Li_4SiO_4-LiI-LiOH$, $xLi_3PO_4$-$(1-x)Li_4SiO_4$, $Li_2SiS_3$, and phosphorus sulfide compounds are effective.

Examples of effective organic solid electrolytes include polyethylene oxide derivatives or polymers containing the same, polypropylene oxide derivatives or polymers containing the same, polymers containing an ionizing group, a mixture of a polymer containing an ion dissociation group and the above-mentioned aprotic electrolytic solution, phosphoric acid ester polymers, and high polymer matrix materials containing an aprotic polar solvent. Polyacrylonitrile may be added to the electrolytic solution. A combined use of an organic solid electrolyte and an inorganic solid electrolyte is also known.

For the purpose of improving charge and discharge characteristics, the electrolytic solution may contain other compounds, such as pyridine, triethyl phosphite, triethanolamine, a cyclic ether, ethylenediamine, n-glyme, hexaphosphoric triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, pyrrole, 2-methoxyethanol, $AlCl_3$ a monomer providing a (electric) conductive polymer as an electrode active material, triethylenephosphoramide, a trialkylphosphine, morpholine, an aryl compound having a carbonyl group, a crown ether (e.g., 12-crown-4), hexamethylphosphoric triamide and a 4-alkylmorpholine, a bicyclic tertiary amine, an oil, a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to make the electrolytic solution resistant to high-temperature storage, carbonic acid gas may be incorporated thereto.

The positive or negative electrode material mixture may contain an electrolytic solution or an electrolyte. For example, it is known to add the above-mentioned ion-conductive polymer, nitromethane, or an electrolytic solution to the electrode material mixture.

As a separator, an insulating finely porous thin film having high ion permeability and prescribed mechanical strength is used. The film preferably has such a function that the pores are clogged at 80° C. or higher to increase the resistance. A sheet or nonwoven fabric made of an olefin polymer (e.g., polypropylene and/or polyethylene) or glass fiber is used in view of their organic solvent resistance and hydrophobic properties. The pore size of the separator is selected from the range generally used for batteries, e.g., from 0.01 to 10 $\mu$m. The thickness of the separator is selected from the range generally used for batteries, e.g., from 5 to 300 $\mu$m. The separator is prepared by making a synthesized polymer porous by a dry process, stretching, solution removal, solvent removal, or a combination thereof.

A current collector for an electrode active material may be made of any electron-conducting substance which undergoes no chemical change in an assembled battery. Examples of suitable materials of a current collector for the positive electrode include stainless steel, nickel, aluminum, titanium, carbon; and aluminum or stainless steel with its surface treated with carbon, nickel, titanium or silver. Aluminum or an aluminum alloy is particularly preferred. Examples of suitable materials of a current collector for the negative electrode include stainless steel, nickel, copper, titanium, aluminum, carbon; copper or stainless steel with its surface treated with carbon, nickel, titanium or silver; and an Al-Cd alloy. Copper or a copper alloy is particularly preferred. These materials may be subjected to surface oxidation. It is also desirable to make unevenness on the surface of the current collector by surface treatment. The current collector may have a variety of forms, such as a film, a foil, a sheet, a net, a punched sheet, a lath, a porous body, a foamed body, a fibrous body, and so on. While not limiting, the thickness of the current collector is from 1 to 500 $\mu$m.

The battery may have any form, such as a coin, a button, a sheet, a cylinder, a flat shape, an angular shape, and the like.

Drying or dehydration of a pellet or a sheet is conducted by a general means, preferably hot air, vacuum, infrared rays, far infrared rays, electron beams, and low humidity air, either alone or in combination thereof. The drying temperature preferably ranges from 80° to 350° C., and more preferably from 100° to 250° C. From the viewpoint of charge and discharge cycle characteristics, drying is preferably effected to such an extent that the positive and negative electrode material mixtures and the electrolytic solution may each have a water content of not more than 500 ppm, with the total battery water content being not more than 2000 ppm.

Compression of the pellet or sheet may be carried out by a generally employed means, and preferably by pressing in a mold or calendering. While not limiting, the pressing pressure is preferably 0.2 to 3 t/cm$^2$. The pressing speed in calendering is preferably 0.1 to 50 m/min. The pressing temperature is preferably from room temperature to 200° C. The ratio of the width of the positive electrode sheet to that of the negative electrode sheet is preferably 0.9 to 1.1, particularly 0.95 to 1.0. The ratio of the content of the positive electrode active material and that of the negative electrode material cannot be specified because it depends on the kinds of compounds used and the compounding ratio in the preparation of the electrode material mixture. That ratio can be optimized with the capacity, cycle characteristics, and safety being taken into consideration.

A positive electrode sheet and a negative electrode sheet are superimposed one another via a separator and inserted into a battery case in a rolled or folded form. The sheets and the case are electrically connected, and an electrolytic solution is poured into the case to form the battery case with a sealing plate. The safety valve may be used as a sealing plate. Various well-known safety elements may also be provided. For example, a fuse, a bimetal, a PTC element, etc. in addition to the safety valve may be used as an element for prevention of over-current. In addition to the safety valve, an increase in inner pressure may be coped with by making cuts on a battery case, making cracks in a gasket, making cracks in a sealing plate, or cut-off from a lead plate. A countermeasure for overcharge or overdischarge may be integrally incorporated into the circuit of a charging machine, or such a protective circuit may be separately connected to a charging machine. As a countermeasure for overcharge, the battery may be provided with a system of shutting off the current by an increase of the inner pressure. In this case, a compound which increases the inner pressure can be incorporated into the electrode material mixture or the electrolytic solution. Examples of such a pressure increasing agent include carbonates, such as $Li_2CO_3$, $LiHCO_3$, $Na_2CO_3$, $NaHCO_3$, $CaCO_3$, and $MgCO_3$.

A battery case and a lead plate are made of an electrically conductive metal or alloys, such as iron, nickel, titanium, chromium, molybdenum, copper, aluminum, and alloys thereof. The cap, case, sheet and lead plate can be joined by a well-known welding technique, such as direct current or alternating current electric welding, laser welding or ultrasonic welding. Conventional compounds or mixtures known as a sealing compound, such as asphalt, can be used as a sealant for the battery.

Application of the nonaqueous secondary battery of the present invention is not particularly limited. For example, it is mounted in electronic equipment, such as notebook color or monochromatic personal computers, sub-notebook personal computers, pen touch computers, pocket (palm-top) personal computers, notebook word processors, pocket word processors, electronic book players, pocket phones, wireless phone extensions, pagers, handy terminals, portable facsimiles, portable copying machines, portable printers, headphone stereos, video cameras, liquid crystal TV sets, handy cleaners, portable CD, mini disk systems, electrical shavers, machine translation systems, land mobile radiotelephones, transceivers, electrical tools, electronic notebooks, portable calculators, memory cards, tape recorders, radios, backup powers, and so on. For livelihood, it is mounted in automobiles, electrically-powered vehicles, motors, lights, toys, family (home) computers, load conditioners, irons, watches, stroboscopic lamps, cameras, medical equipment (e.g., pacemakers, hearing aids, and massaging machines). It is also applicable to military equipment and spacecraft equipment. The nonaqueous secondary battery of the present invention may be used in combination with other secondary batteries, solar batteries or primary batteries.

In carrying out the invention, it is desirable to combine the above-described preferred chemical materials and preferred battery constituent parts. Particularly preferred combinations are as follows. The positive electrode active material comprises at least one compound selected from the group consisting of $Li_xCoO_2$, $Li_xNiO_2$, $Li_xMnO_2$, and $Li_xMn_2O_4$ (wherein x=0.05 to 1.2), and the (electric) conducting agent comprises acetylene black. The positive electrode current collector is in the form of a net, a sheet, a foil, a lath, etc. made up of stainless steel or aluminum. The negative electrode material contains at least one compound containing metallic lithium, a lithium alloy (e.g., Li—Al), a carbonaceous compound, an oxide (e.g., $LiCoVO_4$, $SnO_2$, SnO, SiO, $GeO_2$, GeO, $SnSiO_3$, and $SnSi_{0.3}Al_{0.1}B_{0.2}P_{0.3}O_{3.2}$), a sulfide (e.g., $TiS_2$, $SnS_2$, SnS, $GeS_2$ and GeS), and the like. The negative electrode collector is in the form of a net, a sheet, a foil, a lath, etc. made up of stainless steel or copper. The electrode material mixture containing the positive electrode active material or the negative electrode material may contain a carbonaceous material, such as acetylene black or graphite, as an electron-conductive agent. The binder is selected from the group consisting of fluorine-containing thermoplastic compounds, such as polyvinylidene fluoride and polyfluoroethylene, acrylic acid-containing polymers, styrene-butadiene rubber, elastomers, such as an ethylene-propylene terpolymer, and mixtures thereof. The electrolytic solution contains a combination of ethylene carbonate and a cyclic or acyclic carbonate (such as diethyl carbonate or dimethyl carbonate) or an esterifying agent (such as ethyl acetate) and, as a supporting electrolyte, $LiPF_6$. In addition, a lithium salt, such as $LiBF_4$ or $LiCF_3SO_3$, can be used in combination. The separator is made of polypropylene, polyethylene or a combination thereof. The shape of the battery may be any of a coin, a button, a cylinder, a flat shape, and an angular shape. The battery is provided with a means with which safety can be assured even in case of errors, such as a safety valve of inner pressure release type, a safety valve of current shut-off type, and a separator which increases its resistance at high temperatures.

The present invention will now be illustrated in greater detail with reference to Examples, but the present invention is not limited thereto, and any modifications can be made within the spirit of the present invention.

EXAMPLE 1

The following compounds were used as a positive or negative electrode active material. All the compounds were used after particles having a grain size of greater than 10 μm were removed by sifting. Positive Electrode Active Materials (1) to (3):

(1) $LiCoO_2$
(2) $LiMnO_2$
(3) $LiNiO_2$

Negative Electrode Materials (1) to (18):

(1) $SnSiO_3$
(2) SnO
(3) PbO
(4) $SbO_3$
(5) $Bi_2O_3$
(6) GeO
(7) $SnSi_{0.8}P_{0.2}O_{3.1}$
(8) $SnSi_{0.8}P_{0.2}Al_{0.2}O_{3.4}$
(9) $SnSi_{0.8}P_{0.2}Sb_{0.1}O_{3.25}$
(10) $SnSi_{0.6}P_{0.2}Ge_{0.2}O_{3.1}$
(11) $SnSi_{0.6}P_{0.2}Ge_{0.1}Al_{0.1}O_{3.05}$
(12) $SnP_2O_7$
(13) $SnP_2Al_{0.2}O_{7.3}$
(14) $SnSi_{0.6}P_{0.4}O_{3.2}$
(15) $SnSi_{0.6}P_{0.4}Al_{0.2}O_{3.5}$
(16) $SnSi_{0.2}P_{0.8}Al_{0.2}O_{3.7}$
(17) $Sn_{0.7}Si_{0.2}P_{0.3}P_{0.4}Al_{0.1}O_{2.6}$
(18) Petroleum pitch coke powder Preparation of Positive Electrode Material Mixture Dispersion Pastes (1) to (6):

Ten parts (by weight, hereinafter the same) of acetylene black and 60 parts of a 2 wt % aqueous solution of carboxymethyl cellulose were preliminarily kneaded in a planetary mixer for 5 minutes. To the mixture was added 30 parts of water, and the mixing by stirring was continued for an additional 20 minutes period to prepare a (electric) conducting agent dispersion. To 100 parts of the (electric) conducting agent dispersion were added 200 parts of positive electrode active material (1); $LiCoO_2$ (median size: 5 μm), 8 parts of a water-dispersion of 2-ethylhexyl acrylate/acrylic acid/acrylonitrile copolymer (solids content: 50 wt %) as a binder, and 20 parts of water, and the mixture was stirred in a planetary mixer for 20 minutes to obtain a dispersion paste of a positive electrode material mixture. The resulting paste is designated positive electrode paste 1. Electrode material mixture pastes, designated positive electrode pastes 2 and 3, were prepared in the same manner as described above except for using positive electrode active materials (2) and (3), respectively. An electrode material mixture paste, designated positive electrode paste 4, was prepared in the same manner as for positive electrode paste 1, except for using positive electrode active material (1) and sodium oleate as a dispersion aid. An electrode material mixture paste, designated positive electrode paste 5, was prepared similarly using polyacrylic acid as a dispersion aid. An electrode material mixture paste, designated positive electrode paste 6, was prepared similarly using graphite (Longa Graphite KS-6) as a (electric) conducting agent. Preparation of Negative Electrode Material Mixture Dispersion Pastes 1 to 17, 51, and 52:

Ten parts of acetylene black, 20 parts of graphite (KS-6), and 50 parts of a 2 wt % aqueous solution of carboxymethyl cellulose were preliminarily kneaded in a planetary mixer for 5 minutes. To the mixture was added 20 parts of water, and the mixing by stirring was continued for an additional 20 minutes period to prepare a (electric) conducting agent dispersion. To 100 parts of the (electric) conducting agent dispersion were added 200 parts of negative electrode active material (1); $SiSnO_3$ (prepared by mixing $SiO_2$ and SnO and calcining the mixture at 1000° C. for 12 hours in an argon atmosphere, followed by grinding; median size: 2 μm), 10 parts of polyvinylidene fluoride as a binder, and 10 parts of water, and the mixture was stirred in a planetary mixer for 20 minutes to obtain a paste of a negative electrode material mixture. The resulting negative electrode material mixture dispersion paste is designated negative electrode paste 1. Electrode material mixture pastes, designated negative electrode pastes 2 to 17, were prepared in the same manner as described above, except for using each of negative electrode active materials (2) to (17), respectively. An electrode material mixture paste, designated negative electrode paste 51, was prepared in the same manner as for negative electrode paste 1, except for using negative electrode active material (1) and a styrene/maleic acid copolymer as a dispersion aid. An electrode material mixture paste, designated negative electrode paste 52, was prepared in the same manner except for using a modified polyvinyl alcohol (Kuraray Poval MP-103) as a dispersion aid. Preparation of Comparative Positive Electrode Material Mixture Dispersion Pastes 101 and 102:

An electrode material mixture having the same composition as positive electrode paste 1 was prepared by mixing and stirring the components all at once without previously preparing a (electric) conducting agent dispersion. That is, 10 parts of acetylene black, 60 parts of a 2 wt % aqueous solution of carboxymethyl cellulose, 200 parts of a positive electrode active material; $LiCoO_2$ (median size: 5 $\mu$m), 8 parts of a water-dispersion of a binder (solids content: 50 wt %), and 50 parts of water were mixed and stirred in a planetary mixer for 60 minutes or 180 minutes to obtain a dispersion paste of a positive electrode material mixture, which is designated positive electrode paste 101 or 102, respectively. Preparation of Comparative Negative Electrode Material Mixture Dispersion Pastes 101 and 102:

An electrode material mixture having the same composition as negative electrode paste 1 was prepared by mixing and stirring the components all at once in the same mixing machine as used above without previously preparing a (electric) conducting agent dispersion. That is, 10 parts of acetylene black, 20 parts of graphite (KS-6), 50 parts of a 2 wt % aqueous solution of carboxymethyl cellulose, 200 parts of a negative electrode active material; $SiSnO_3$, 10 parts of polyvinylidene fluoride as a binder, and 30 parts of water were mixed and stirred in a planetary mixer for 60 minutes or 180 minutes to obtain a dispersion paste of a negative electrode material mixture, which is designated negative electrode paste 101 or 102, respectively.

In Tables 1 and 2 below are shown average particle size data indicative of the dispersion state of the electrode material mixture dispersion pastes prepared above. In these Tables are also shown filterability of these electrode material mixture pastes in filtration through a microfilter having a pore size of 30 $\mu$m.

It is seen that the electrode material mixtures according to the invention which were prepared by using a separately prepared (electric) conducting agent dispersion achieve a smaller average particle size in a shorter dispersion time, i.e., with lesser power as compared with those prepared for comparison, proving to have more satisfactory dispersion state while preventing the dispersed particles of the electrode material mixture from agglomerating. Further, the filter cake of the comparative pastes in the above-mentioned filtration test was revealed on analysis to be an agglomerate of the carbonaceous compound. Such a filter cake was not observed in the pastes of the invention, proving that the (electric) conducting agent comprising a carbonaceous compound, i.e., acetylene black or graphite, had been dispersed satisfactorily.

TABLE 1

| Example | Positive Electrode Paste | Conducting Agent Dispersion | Positive Electrode Active Material | Total Mixing Time (min) | Average Particle Size ($\mu$m) | Filter Cake |
|---|---|---|---|---|---|---|
| Invention | 1 | used | (1) | 45 | 5 | not observed |
| Comparison | 101 | not used | (1) | 60 | 30 | observed |
| Comparison | 102 | not used | (1) | 180 | 17 | observed |
| Invention | 2 | used | (2) | 45 | 6 | not observed |
| Invention | 3 | used | (3) | 45 | 6 | not observed |

TABLE 2

| Example | Negative Electrode Paste | Conducting Agent Dispersion | Negative Electrode Material | Total Mixing Time (min) | Average Particle Size ($\mu$m) | Filter Cake |
|---|---|---|---|---|---|---|
| Invention | 1 | used | (1) | 45 | 4 | not observed |
| Comparison | 101 | not used | (1) | 60 | 25 | observed |
| Comparison | 102 | not used | (1) | 180 | 13 | observed |
| Invention | 2 | used | (2) | 45 | 5 | not observed |

TABLE 2-continued

| Example | Negative Electrode Paste | Conducting Agent Dispersion | Negative Electrode Material | Total Mixing Time (min) | Average Particle Size ($\mu$m) | Filter Cake |
|---|---|---|---|---|---|---|
| Invention | 3 | used | (3) | 45 | 4 | not observed |
| Invention | 4 | used | (4) | 45 | 4 | not observed |
| Invention | 5 | used | (5) | 45 | 5 | not observed |
| Invention | 6 | used | (6) | 45 | 5 | not observed |
| Invention | 7 | used | (7) | 45 | 5 | not observed |
| Invention | 8 | used | (8) | 45 | 6 | not observed |
| Invention | 9 | used | (9) | 45 | 5 | not observed |
| Invention | 10 | used | (10) | 45 | 5 | not observed |
| Invention | 11 | used | (11) | 45 | 5 | not observed |
| Invention | 12 | used | (12) | 45 | 6 | not observed |
| Invention | 13 | used | (13) | 45 | 5 | not observed |
| Invention | 14 | used | (14) | 45 | 5 | not observed |
| Invention | 15 | used | (15) | 45 | 4 | not observed |
| Invention | 16 | used | (16) | 45 | 5 | not observed |
| Invention | 17 | used | (17) | 45 | 5 | not observed |

Preparation of Batteries 1 to 15:

Each of the positive electrode material mixture pastes prepared was applied to both sides of a 30 $\mu$m thick aluminum foil current collector with a blade coater, dried, compression-molded with a roller press, and cut into a strip of prescribed size to prepare a positive electrode sheet. The thickness of the sheet after compression-molding was 220 $\mu$m. The positive electrode sheet was thoroughly dried in a dry box (dried air having a dew point of −50° to −70° C.) by means of a far infrared heater.

In the same manner as for the positive electrode, each of the negative electrode material mixture pastes prepared was applied to both sides of a 20 $\mu$m thick copper foil current collector to prepare a negative electrode sheet. Additionally, a comparative negative electrode material mixture paste, designated negative electrode material 118, was prepared in the same manner as for the comparative electrode material mixture paste 101, except for using petroleum pitch coke (negative electrode material (18)) as a negative electrode material and stirring was performed for 60 minutes, and a negative electrode sheet was prepared using the resulting paste 118.

The positive electrode sheet, a separator made of a finely porous polypropylene film, the negative electrode sheet, and the same separator were superimposed in this order, and the laminate was rolled up into a cylinder. The roll was inserted into a closed-end cylindrical battery case made of nickel-plated iron which also served as a negative electrode terminal. An electrolytic solution comprising 1 mol/l of $LiPF_6$ and a 1:1 mixed solvent of ethylene carbonate and 1,2-dimethoxyethane was poured into the battery case. A battery cover having a positive electrode terminal was fitted into the top of the case via a gasket to prepare a cylindrical battery.

The combination of the positive and negative electrode mixture pastes in the batteries and the capacity ratio of the positive electrode to the negative electrode are shown in Table 3 below.

It is seen that any of the cylindrical batteries in which the positive electrode sheet and/or the negative electrode sheet was/were those prepared from an electrode material mixture paste which was prepared by using a separately prepared dispersion of a (electric) conducting agent comprising a carbonaceous compound exhibits a higher capacity as compared with the comparative batteries in which neither of such a positive electrode sheet nor such a negative electrode sheet was used.

TABLE 3

| Battery No. | Positive Electrode Paste | Conducting Agent Dispersion | Negative Electrode Paste | Conducting Agent Dispersion | Capacity Ratio | Remark |
|---|---|---|---|---|---|---|
| 1 | 1 | used | 1 | used | 107 | Invention |
| 2 | 1 | used | 12 | used | 105 | " |
| 3 | 1 | used | 15 | used | 105 | " |
| 4 | 1 | used | 17 | used | 106 | " |
| 5 | 2 | used | 1 | used | 105 | " |

TABLE 3-continued

| Battery No. | Positive Electrode Paste | Conducting Agent Dispersion | Negative Electrode Paste | Conducting Agent Dispersion | Capacity Ratio | Remark |
|---|---|---|---|---|---|---|
| 6 | 3 | used | 52 | used | 105 | " |
| 7 | 1 | used | 101 | not used | 102 | " |
| 8 | 2 | used | 101 | not used | 103 | " |
| 9 | 4 | used | 118 | not used | 102 | " |
| 10 | 101 | not used | 1 | used | 103 | " |
| 11 | 101 | not used | 17 | used | 104 | " |
| 12 | 101 | not used | 101 | not used | 100 | Comparison |
| 13 | 101 | not used | 102 | not used | 100 | " |
| 14 | 101 | not used | 118 | not used | 98 | " |
| 15 | 102 | not used | 102 | not used | 101 | " |

EXAMPLE 2

The following compounds were used as a negative electrode material or a positive electrode active material. Negative Electrode Materials (1) to (10):

(1) $SnSi_{0.6}Al_{0.3}B_{0.3}P_{0.2}O_{3.6}$
(2) $SnSi_{0.6}Mg_{0.1}Al_{0.3}B_{0.2}O_{3.05}$
(3) $SnSiO_3$
(4) $SnSi_{0.6}Al_{0.2}P_{0.4}O_{3.5}$
(5) $SnSi_{0.8}P_{0.2}O_{3.1}$
(6) $SnAl_{0.3}B_{0.5}P_{0.2}O_{2.7}$
(7) $SnB_{0.5}P_{0.5}O_3$
(8) $SnO$
(9) $SnSi_{0.6}P_{0.4}O_{3.2}$
(10) Petroleum pitch coke powder Positive Electrode Active Materials (1) to (3):

(1) $LiCoO_2$
(2) $LiMnO_2$
(3) $LiNiO_2$

Preparation of Negative Electrode Sheet:

Two hundred parts of negative electrode material (1); $SnSi_{0.6}Al_{0.3}B_{0.3}P_{0.2}O_{3.6}$ (median size: 5 μm), 10 parts of acetylene black (Denka Black, produced by Denki Kagaku Kogyo K. K.) and 20 parts of graphite (Lonza Japan KS-6) as (electric) conducting agents, 10 parts of polyvinylidene chloride as a binder, and 50 parts of a 2 wt % aqueous solution of carboxymethyl cellulose as a dispersant were preliminarily kneaded in a planetary mixer for 5 minutes. To the mixture was added 30 parts of water, followed by further stirring for 20 minutes to obtain a negative electrode material mixture paste. The resulting electrode material mixture dispersion paste is designated negative electrode paste 1. Electrode material mixture dispersion pastes, designated negative electrode pastes 2 to 10, were similarly prepared by using each of negative electrode materials (2) to (10) respectively. Electrode material mixture dispersion pastes, designated negative electrode pastes 108 and 109, were prepared in the same manner as described above, except for using negative electrode material 8 or 9 and previously adding 0.5 part of lithium hydroxide as a pH adjustor together with the negative electrode material. Negative electrode paste 208 was similarly prepared by using negative electrode material 8 and 3 parts of lithium hydroxide. Further, 1 part of sodium carbonate was added to negative electrode paste 8 as a pH adjustor, followed by stirring for 5 minutes, to prepare negative electrode paste 308.

Each of the resulting negative electrode pastes was maintained at a constant temperature in a thermostated temperature liquid bath for a prescribed period of time. Then, the paste was applied to both sides of a 20 μm thick copper foil current collector with a blade coater, dried, compression molded by means of a roller press, and cut into a strip of prescribed size to prepare a negative electrode sheet. The thickness of the sheet after compression molding was 90 μm. The negative electrode sheet was thoroughly dried in a dry box (dried air having a dew point of −50° to −70° C.) with a far infrared heater.

Preparation of Positive Electrode Sheet:

Two hundred parts of positive electrode active material (1); $LiCoO_2$ (median size: 5 μm), 10 parts of acetylene black as a (electric) conducting agent, 8 parts of a water-dispersion of a 2-ethylhexyl acrylate/acrylic acid/acrylonitrile copolymer (solids content: 50 wt %) as a binder, and 60 parts of a 2 wt % aqueous solution of carboxymethyl cellulose as a dispersant were preliminarily kneaded in a planetary mixer for 5 minutes. To the mixture was added 50 parts of water, and the mixing by stirring was continued for an additional 20 minutes period to prepare a positive electrode material mixture dispersion paste. The resulting paste is designated positive electrode paste 1. Positive electrode material mixture pastes, designated positive electrode pastes 2 and 3, were prepared in the same manner as described above, except for using positive electrode active materials (2) and (3), respectively.

Each of positive electrode pastes 1, 2 and 3 prepared above was applied to a 30 μm thick aluminum foil current collector and further treated in the same manner as for the negative electrode sheets to obtain positive electrode sheets 1, 2, and 3, respectively.

Preparation of Batteries:

The negative electrode sheet, a separator made of a finely porous polypropylene film, the positive electrode sheet, and the same separator were superimposed in this order, and the laminate was rolled up into a cylinder. The roll was inserted into a closed-end cylindrical battery case made of nickel-plated iron which also served as a negative electrode terminal. An electrolytic solution comprising 1 mol/l of $LiPF_6$ and a 1:1 mixed solvent of ethylene carbonate and 1,2-dimethoxyethane was poured into the battery case. A battery cover having a positive electrode terminal was fitted into the top of the case via a gasket to prepare a cylindrical battery.

The combination of the positive and negative electrode mixture pastes in the batteries and the results of a cycle test in which charge and discharge were conducted at a current of 3.5 mA/m² per unit area of the electrode sheet are shown in Tables 4 and 5 below. In the tables, the capacity retention (%) is the result after 300 cycles.

TABLE 4

| Battery No. | Negative Electrode Sheet | Negative Electrode Paste | Negative Electrode Material | pH | Storage Temperature (°C.) | Storage Time (dys) | Positive Electrode Sheet | Capacity Retention (%) | Remark |
|---|---|---|---|---|---|---|---|---|---|
| 1 | 1 | 1 | (1) | 6.5 | 25 | 1 | 1 | 90 | Invention |
| 2 | 2 | 2 | (2) | 7.8 | 25 | 1 | 1 | 91 | " |
| 3 | 3 | 3 | (3) | 5.5 | 25 | 1 | 1 | 78 | " |
| 4 | 4 | 4 | (4) | 9.5 | 25 | 1 | 1 | 80 | " |
| 5 | 5 | 5 | (5) | 7.2 | 25 | 1 | 2 | 82 | " |
| 6 | 6 | 6 | (6) | 7.1 | 25 | 1 | 3 | 78 | " |
| 7 | 7 | 7 | (7) | 3.3 | 25 | 1 | 1 | 35 | Comparison |
| 8 | 8 | 8 | (8) | 4.2 | 25 | 1 | 1 | 45 | " |
| 9 | 9 | 108 | (8) | 7.3 | 25 | 1 | 1 | 85 | Invention |
| 10 | 10 | 208 | (8) | 11.0 | 25 | 1 | 1 | 60 | Comparison |
| 11 | 11 | 308 | (8) | 7.0 | 25 | 1 | 1 | 87 | Invention |
| 12 | 12 | 9 | (9) | 4.3 | 25 | 1 | 1 | 38 | Comparison |
| 13 | 13 | 109 | (9) | 7.4 | 25 | 1 | 1 | 83 | Invention |
| 14 | 14 | 10 | (10) | 7.1 | 25 | 1 | 1 | 88 | " |

Observations of Table 4:

The batteries prepared by using the negative electrode sheets which were prepared from the negative electrode pastes whose pH is within a preferred range according to the invention (battery Nos. 1 to 6, 9, 11, 13, and 14) are superior in cyclic characteristics to those prepared from the pastes whose pH is too low (battery Nos. 7, 8, and 12) or the one prepared from the paste whose pH is too high (battery No. 10). Further, the batteries prepared from the pastes whose pH has been adjusted to a preferred value by previously adding a pH adjustor (negative electrode pastes 108 and 109/battery Nos. 9 and 13) and the battery prepared from the paste whose pH has been adjusted to a preferred value by adding a pH adjustor immediately after the preparation (negative paste 308/battery No. 11) are superior in cycle characteristics to those prepared from the pastes using no pH adjustor (battery Nos. 8 and 12).

observed with the negative electrode material before being formulated into a paste. This seems to be because a new crystallized portion had been formed on the surface of the negative electrode material.

Battery 21 was produced in the same manner as for battery No. 1, except that negative paste 1 was prepared by using the same amount of acetylene black which had been preliminarily dispersed in the same manner as in Example 1. Battery 22 was produced in the same manner as for battery No. 2, except for using preliminarily dispersed acetylene black. The capacity retention of batteries 21 and 22 was 93% and 94%, respectively. It is thus proved that cycle characteristics can be improved by preliminarily dispersing the (electric) conducting agent.

EXAMPLE 3

The following compounds were used as a negative electrode material.

TABLE 5

| Battery No. | Negative Electrode Sheet | Negative Electrode Paste | Negative Electrode Material | pH | Storage Temperature (°C.) | Storage Time | Positive Electrode Sheet | Capacity Retention (%) | Remark |
|---|---|---|---|---|---|---|---|---|---|
| 15 | 15 | 1 | (1) | 6.5 | 25 | 3 hrs | 1 | 90 | Invention |
| 16 | 16 | 1 | (1) | 6.5 | 15 | 3 hrs | 1 | 90 | " |
| 17 | 17 | 1 | (1) | 6.5 | 60 | 3 hrs | 1 | 82 | " |
| 18 | 18 | 1 | (1) | 6.5 | 85 | 3 hrs | 1 | 70 | " |
| 19 | 19 | 1 | (1) | 6.5 | 25 | 5 dys | 1 | 88 | " |
| 20 | 20 | 1 | (1) | 6.5 | 25 | 10 dys | 1 | 85 | " |

Observations of Table 5:

With the composition being the same, the negative electrode pastes which have been kept at a lower temperature bring about better cycle characteristics as can be seen from the results of battery Nos. 15, 16, 17, and 18. However, when the storage temperature was 0° C., the pastes had deteriorated fluidity and thereby the paste had poor coating properties, failing to produce batteries.

Further, the shorter the storage time of the negative electrode paste from its preparation, the better the cycle characteristics of the resulting battery (batter No. 15 as compared with battery Nos. 19 and 20).

The negative electrode sheets were analyzed by X-ray diffractometry using CuKα rays. As a result, sheet Nos. 1 to 6, 9, 11, 13, and 14 showed no additional diffraction lines except those observed with the individual materials constituting the electrode material mixture before they are formulated into a paste. On the other hand, sheet Nos. 7, 8, 10, and 12 showed additional diffraction lines which were not (1) SnO
(2) GeO
(3) PbO
(4) $Pb_2O_3$
(5) $Bi_2O_3$
(6) $SnSiO_3$
(7) $SnSi_{0.8}P_{0.2}O_{3.1}$
(8) $SnSi_{0.8}P_{0.2}Al_{0.2}O_{3.4}$
(9) $SnSi_{0.8}P_{0.2}Sb_{0.1}O_{3.25}$
(10) $SnSi_{0.6}P_{0.2}Ge_{0.2}O_{3.1}$
(11) $SnSi_{0.6}P_{0.2}Ge_{0.1}Al_{0.1}O_{3.05}$
(12) $Sn_2P_2O_7$
(13) $Sn_2P_2Al_{0.2}O_{7.3}$
(14) $SnSi_{0.6}P_{0.4}O_{3.2}$
(15) $SnSi_{0.6}P_{0.4}Al_{0.2}O_{3.5}$

(16) $SnSi_{0.2}P_{0.8}Al_{0.2}O_{3.7}$
(17) $Li_4SiO_4$
(18) LiSiO

Eighty-six parts of each of the above-listed negative electrode active materials, 3 parts of acetylene black and 6 parts of graphite as (electric) conducting agents, 4 parts of polyvinylidene chloride as a binder, and 1 part of carboxymethyl cellulose were mixed. The mixture was kneaded using water as a medium to prepare a slurry. The resulting slurry was applied on both sides of a 18 μm thick copper foil with a doctor blade coater, dried, and compression-molded by calendering to prepare a strip of a negative electrode sheet. The thickness of the electrode material mixture on one side of the negative electrode sheet after the compression molding is shown in Table 6 below.

Eighty-seven parts of $LiCoO_2$ as a positive electrode active material, 9 parts of graphite as a (electric) conducting agent, 3 parts of Nipol LX820B (produced by Nippon Zeon Co., Ltd.) as a binder, and 1 part of carboxymethyl cellulose were kneaded with water to prepare a slurry. The resulting slurry was applied on both sides of a 20 μm thick aluminum foil substrate (electric collector), dried, and compression-molded by calendering to prepare a strip of a positive electrode sheet. The thickness of the electrode material mixture on one side of the positive electrode sheet after the compression molding is shown in Table 6 below.

A nickel-made lead-out plate and an aluminum-made lead plate were welded to the terminal of the negative electrode sheet and the terminal of the positive electrode sheet, respectively. Both the negative and positive electrode sheets were subjected to heat treatment at 150° C. for 2 hours in dried air having a dew point of −40° C. or below by means of a far infrared heater. The heat-treated positive electrode sheet (reference numeral 5 in FIG. 1), finely porous polypropylene film separator 3 (Cell Guard 2400), heat-treated negative electrode sheet 4, and separator 3 were superimposed in this order, and the laminate was rolled up.

The roll was inserted into closed-end cylindrical battery case 2 made of nickel-plated iron which also served as a negative electrode terminal. An electrolytic solution comprising 1 mol/l of $LiPF_6$ and a 2:8 (by weight) mixed solvent of ethylene carbonate and diethyl carbonate was poured into the battery case. Battery cover 8 having a positive electrode terminal was fitted into the top of the case via gasket 1 to prepare a cylindrical battery. Positive electrode terminal 8 was previously connected to positive electrode sheet 5, and battery case 2 was previously connected to negative electrode sheet 4 with a leading terminal. The cross section of the resulting cylindrical battery is shown in FIG. 1, in which reference numeral 7 is a safety valve.

The resulting battery was subjected to a charge and discharge cycle test by repeatedly charging to 4.2 V at a current density of 1 $mA/cm^2$ followed by discharging till a voltage of 2.7 V. The number of cycles at which the discharge capacity was reduced to 60% of the initial capacity was taken as a charge and discharge cycle life. The internal resistivity of the battery at 1 kHz was also measured. The results obtained are shown in Table 6 below.

TABLE 6

| Run No. | Remark | Negative Electrode Active Material | Negative Electrode Thickness (μm) | Positive Electrode Thickness (μm) | Internal Resistivity (mΩ) | Discharge Capacity (mAh) | Charge and Discharge Cycle Life (cycle) |
|---|---|---|---|---|---|---|---|
| 1 | Invention | (1) | 35 | 120 | 72 | 625 | 582 |
| 2 | " | (2) | 22 | 106 | 69 | 598 | 643 |
| 3 | " | (3) | 32 | 125 | 70 | 612 | 598 |
| 4 | " | (4) | 43 | 140 | 78 | 653 | 550 |
| 5 | " | (5) | 56 | 151 | 82 | 647 | 510 |
| 6 | " | (6) | 33 | 115 | 75 | 600 | 581 |
| 7 | " | (7) | 64 | 160 | 86 | 672 | 474 |
| 8 | " | (8) | 19 | 100 | 65 | 540 | 699 |
| 9 | " | (9) | 38 | 142 | 72 | 603 | 561 |
| 10 | " | (10) | 70 | 165 | 90 | 680 | 429 |
| 11 | " | (11) | 39 | 131 | 78 | 605 | 558 |
| 12 | " | (12) | 44 | 138 | 81 | 623 | 548 |
| 13 | " | (13) | 51 | 147 | 84 | 637 | 503 |
| 14 | " | (14) | 37 | 121 | 74 | 611 | 559 |
| 15 | " | (15) | 14 | 95 | 60 | 502 | 708 |
| 16 | Invention | (16) | 78 | 168 | 98 | 689 | 419 |
| 17 | " | (17) | 36 | 118 | 79 | 479 | 398 |
| 18 | " | petroleum pitch coke | 80 | 102 | 99 | 403 | 568 |
| 19 | " | (18) | 36 | 118 | 78 | 451 | 412 |
| 20 | " | (19) | 32 | 107 | 80 | 424 | 399 |
| 21 | Comparison | (1) | 8 | 79 | 60 | 356 | 689 |
| 22 | " | (1) | 103 | 152 | 101 | 624 | 258 |
| 23 | " | (1) | 94 | 184 | 114 | 600 | 234 |
| 24 | "* | (1) | 9 | 250 | — | — | — |
| 25 | " | petroleum pitch coke | 98 | 156 | 105 | 348 | 220 |

Note: *In Run No. 24, the positive electrode was broken in rolling and failed to be assembled into a battery.

Industrial Applicability

As has been described above, the nonaqueous secondary battery of the present invention and the process for producing the same according to the invention ensure excellent battery performance properties, such as charge and discharge cycle characteristics.

We claim:

1. A process for producing a nonaqueous secondary battery, in a battery casing, where said battery comprises positive and negative electrodes capable of intercalating and deintercalating lithium and a nonaqueous electrolyte containing a lithium salt, the process comprising:

preparing said electrodes by applying a water-dispersion electrode material mixture paste containing at least an active material capable of intercalating and deintercalating lithium and at least one conducting agent comprising a carbonaceous compound onto a current collector, and drying, wherein at least one of said electrodes is prepared from a water-dispersion electrode material mixture paste comprising water having dispersed therein at least one conducting agent together with a dispersion aid;

said conducting agent and said dispersion aid are preliminarily kneaded prior to the addition of active materials; and the pH of said water-dispersion electrode material mixture paste is adjusted to the range of 5 to 10.

2. A nonaqueous secondary battery, in a battery casing, said battery comprising positive and negative electrode sheets and a nonaqueous electrolyte containing a lithium salt, wherein said electrodes are prepared by applying a water-dispersion electrode material mixture paste containing at least an active material capable of intercalating and deintercalating lithium and at least one conducting agent comprising a carbonaceous compound onto a collector and drying;

at least one of said positive and negative electrode sheets is prepared from a water-dispersion electrode material mixture paste comprising water having dispersed therein at least one conducting agent together with a dispersion aid;

said conducting agent and said dispersion aid are preliminarily kneaded prior to the addition of active materials; and said water-dispersion electrode material mixture paste has a pH of 5 to 10.

3. The nonaqueous secondary battery as claimed in claim 2, which has a negative electrode sheet and a positive electrode sheet each comprising a conducting support sheet having provided on both sides thereof an electrode material mixture by coating or press bonding, wherein the thickness of the electrode material mixture on one side of the negative electrode is 10 to 80 $\mu$m and that of the positive electrode is 100 to 180 $\mu$m both at the time of battery assembly.

4. The nonaqueous secondary battery as claimed in claim 2, wherein at least one conducting agent dispersed in water is acetylene black.

5. The nonaqueous secondary battery as claimed in claim 2, wherein at least one negative electrode active material contained in the negative electrode material mixture is a compound selected from the group consisting of an oxide and a chalcogen compound containing at least one element selected from the elements belonging to the groups IIIA, IVA, and VA of the Periodic Table.

6. The nonaqueous secondary battery as claimed in claimed 2, wherein the water-dispersion paste to be used for the preparation of the negative electrode sheet is at a temperature of from 5° C. to less than 80° C.

7. The nonaqueous secondary battery as claimed in claim 2, wherein the application of the water-dispersion paste used for the preparation of the negative electrode sheet onto the current collector is within 7 days after the preparation of the water-dispersion paste.

* * * * *